United States Patent [19]

Bae

[11] Patent Number: 5,567,542
[45] Date of Patent: Oct. 22, 1996

[54] HOLDER OF RECHARGEABLE BATTERY CELLS AND RETAINER THEREOF FOR USE IN AN ELECTRIC VEHICLE

[75] Inventor: Do-In Bae, Kyungsangnam-Do, Rep. of Korea

[73] Assignee: Hyundai Motor Company, Seoul, Rep. of Korea

[21] Appl. No.: 360,638

[22] Filed: Dec. 21, 1994

[30] Foreign Application Priority Data

Dec. 21, 1993 [KR] Rep. of Korea ................ 93-28906
Dec. 21, 1993 [KR] Rep. of Korea ................ 93-28907

[51] Int. Cl.⁶ ............................................. H01M 2/10
[52] U.S. Cl. ................................. 429/99; 429/120
[58] Field of Search .................... 429/99, 120; 180/68.5

[56] References Cited

U.S. PATENT DOCUMENTS

| | | | |
|---|---|---|---|
| 2,385,127 | 9/1945 | Carlile | 429/120 X |
| 3,061,662 | 10/1962 | Toce et al. | 429/99 |
| 4,020,244 | 4/1977 | Selinko | 429/100 |
| 4,314,008 | 2/1982 | Blake | 429/8 |
| 4,317,497 | 3/1982 | Alt et al. | 429/99 X |
| 4,517,263 | 5/1985 | Reiss et al. | 429/120 |
| 5,015,545 | 5/1991 | Brooks | 429/99 |
| 5,040,627 | 8/1991 | Swayze | 429/99 X |
| 5,173,378 | 12/1992 | Brown et al. | 429/120 |

OTHER PUBLICATIONS

Abstract of U.S. Pat. No. 3,537,907, issued Nov. 3, 1970 to A. M. Wilson.

*Primary Examiner*—Stephen Kalafut
*Attorney, Agent, or Firm*—Birch, Stewart, Kolasch & Birch, LLP

[57] ABSTRACT

A holder of rechargeable battery cells includes a lower frame, a plurality of housings, a multiplicity of heat sinks and an upper frame to dissipate heat generated from the battery cells. The lower frame has a vertical rim and horizontal flanges extending inwardly from the bottom of the rim to define a receptacle. Each tubular housing accommodating the battery cells therein is received in the receptacle and supported by the lower frame. A pair of heat sink members are attached to opposing sides of each of the housings and each of the heat sink members has a large number of fins. A retainer including a frame, stay rods and securing members is used to secure the holder.

19 Claims, 6 Drawing Sheets

HOLDER OF RECHARGEABLE BATTERY CELLS AND RETAINER THEREOF FOR USE IN AN ELECTRIC VEHICLE

BACKGROUND OF THE INVENTION

1. Field of the Invention

The present invention relates to a battery system of an electric vehicle and, more particularly, to a holder of battery cells capable of dissipating heat produced by operation of the battery cells to the battery system surroundings and a retainer for securing the holder.

2. Description of the Prior Art

As is well known, automobiles driven by burning fossil fuels have been a major source of air pollution. and Consequently, studies have been made to develop commercially feasible electric vehicles powered by electric energy supplied by a battery system therein. The battery system generally has a plurality of battery cells which are electrically connected in a serial or parallel manner to provide a requisite voltage. The battery cells are arranged close together to minimize the space requirement of the battery system. Accordingly, a suitable device which is capable of transferring heat produced during the operation of battery cells in the small space is required. Further, the battery system needs an appropriate system for securing the battery cells tightly so that the battery cells will not become damaged or disrupted while the vehicle is in use on, e.g., a rough or uneven road.

SUMMARY OF THE INVENTION

Accordingly, it is an object of the present invention to provide a holder incorporating a plurality of battery cells such that the holder is capable of transferring or dissipating heat generated from the battery cells to their surroundings.

It is another object of the present invention to provide a retainer for tightly securing the holder so as to avoid any damage to the battery cells.

In accordance with one aspect of the present invention, there is provided a holder of battery cells adapted to transfer heat produced from operating the battery cells to their surroundings, which comprises:

- a lower frame having a vertical rim and horizontal flanges extending inwardly from the bottom of the rim to define a receptacle;
- a plurality of housings for accommodating the battery cells, a bottom portion of each of the housings being received in the receptacle of the lower frame;
- a at least a pair of heat sink members attached to the housings, each of the heat sink members having a large number of fins; and
- an upper frame having a vertical rim and horizontal flanges extending inwardly from the top of the rim to contain and hold a top portion of each of the housings.

In accordance with another aspect of the present invention, there is provided a retainer for securing a holder, said holder being adapted to accommodate an array of battery cells, which comprises:

- a frame having a plurality of side beams and horizontal shelves extending inwardly from the bottom of the frame for supporting the holder;
- a multiplicity of stay rods standing on the beams, each of the stay rods having a first end portion fixed to the frame; and
- means for securing the holder, said means being detachably attached to a second end portion of each of the stay rods.

BRIEF DESCRIPTION OF THE DRAWINGS

The above and other objects, advantages and features of the present invention will become apparent from the following description of preferred embodiments taken in conjunction with the accompanying drawings, wherein.

DETAILED DESCRIPTION OF THE PREFERRED EMBODIMENTS

Figure 1:
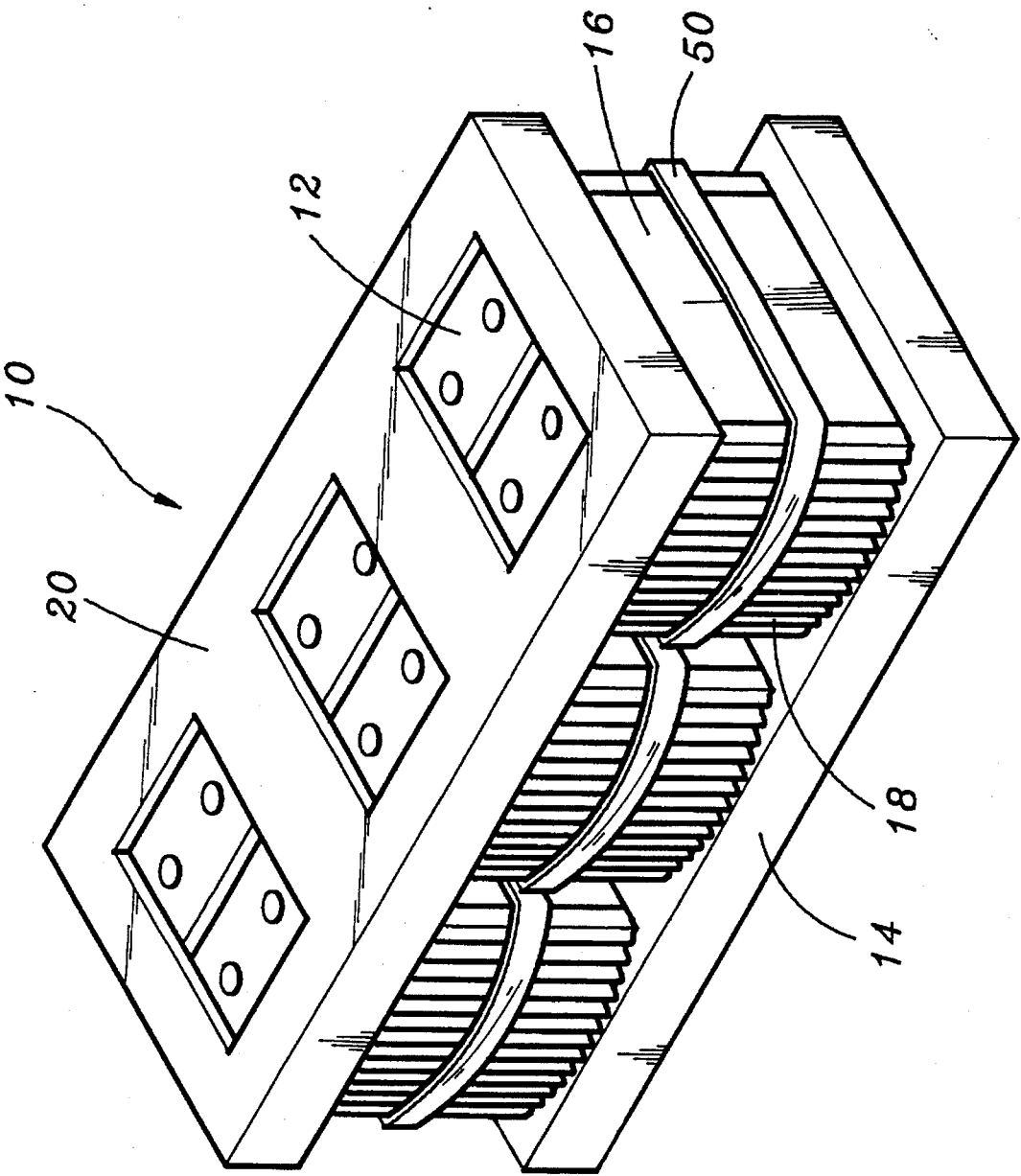
FIG. 1 is a perspective view showing a holder incorporating a plurality of battery cells therein in accordance with the present invention.

Referring to FIG. 1, there is shown a holder 10 retaining a plurality of battery cells 12 for use in an electric vehicle. The holder 10 includes a lower frame 14, a plurality of housings 16, a multiplicity plurality of heat sink members 18 and an upper frame 20.

In a preferred embodiment of the present invention, the battery cells 12 are of a Ni—MH (Nickel-Metal Hydride) type. However, it should be understood that any suitable battery cells may be used. Each battery cell 12 is provided with a plurality of electrodes and an electrolyte in a sealed housing, and has positive and negative terminals.

Figure 2:
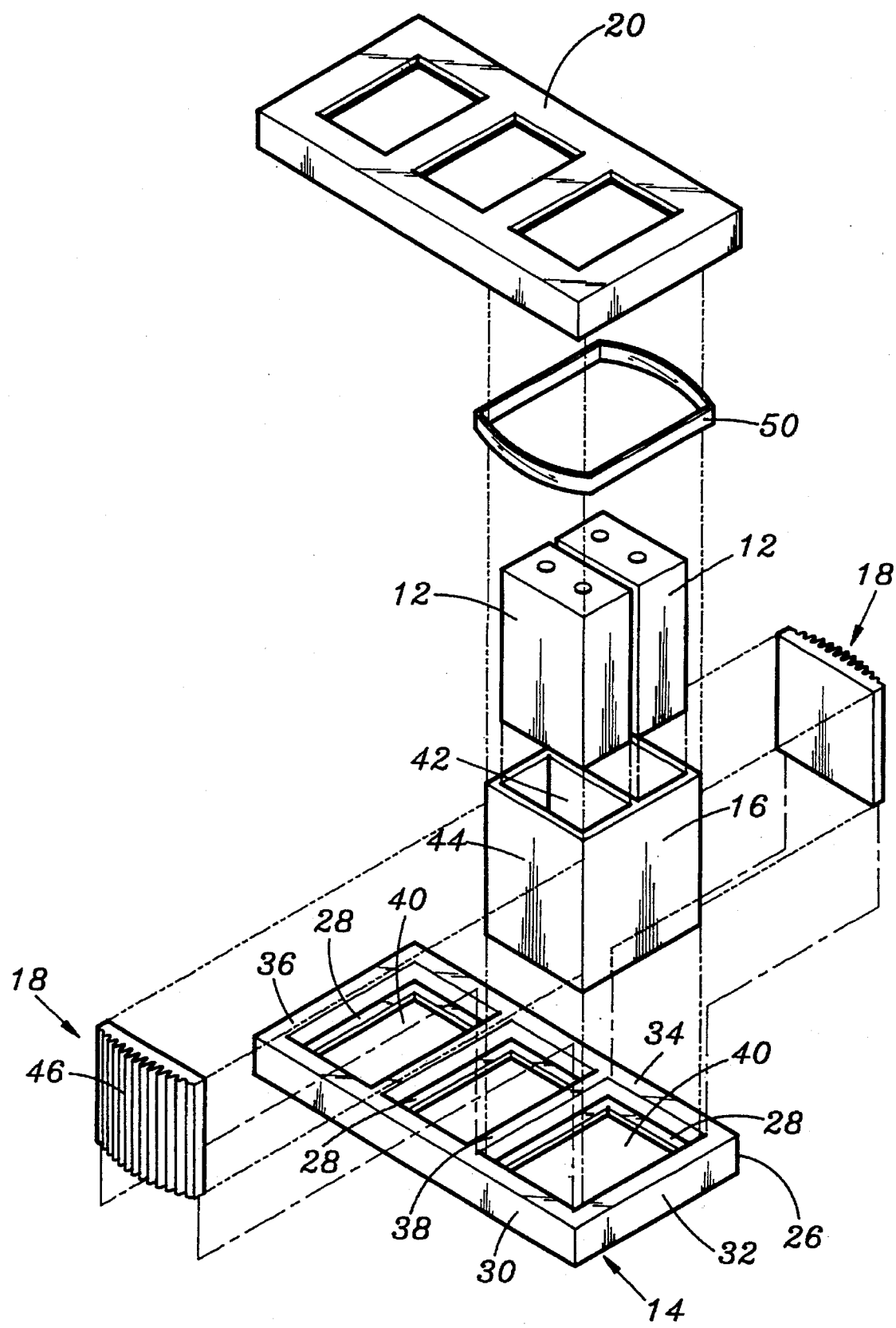
FIG. 2 is an exploded perspective view of the holder shown in FIG. 1.

As shown in FIG. 2, the lower frame 14 of rectangular shape includes a vertical rim 26 and horizontal flanges 28. The vertical rim 26 has four side walls 30, 32, 34, and 36. Several intermediate members 38 are preferably engaged with the side walls 30, 34. Horizontal flanges 28 extend inwardly from the bottom parts of the side walls 30, 32, 34, 36 and the intermediate members 38 for supporting the battery cells 12. The sides 30, 32, 34, 36, the intermediate members 38, and flanges 28 define receptacles 40. The lower frame 14 is preferably made of an aluminum alloy. Insulation tapes (not shown) may be attached to the horizontal flanges 28 to insulate between the battery cells 12 and the lower frame 14.

Each rectangular housing 16 has four sides, an open bottom portion and a partition 42 attached to the inside of the housing to insulate the battery cells 12. The length of each housing 16 is substantially equal to the height of each battery cell 12. The housings 16 are made of a nonconducting substance, e.g., a plastic material, to provide insulation. The bottom portions of the housings 16 are received in the receptacles 40 and supported by the horizontal flanges 28. The housings 16 are slightly spaced from each other by the intermediate members 38 to allow cooling air to flow therebetween.

A pair of heat sink members 18 are attached to a pair of opposing walls 44 of each housing 16. Each heat sink member 18 has a large number of fins 46 extending in a vertical direction. The fins positioned at a central portion of said each heat sink member protrude higher than the fins located at the sides thereof. The heat sink members 18 may be made by way of an extrusion process of an aluminum alloy.

Each housing 16 and the heat sink members 18 attached thereto are bound tightly by, e.g., a band 50 to prevent the heat sink members 18 from being detached. The band 50 may be made of a steel strap and the ends thereof are preferably overlapped and spot welded.

The shape of the upper frame 20 is substantially similar to that of the lower frame 14. The upper frame accommodates and holds top portions of the housings 16.

The battery cells 12 placed within the housings 16 are electrically connected to each other by using connectors to provide a requisite voltage to the vehicle. In a preferred embodiment of the present invention, six battery cells, each having the capacity of 1.2 volt, are connected in series to provide the voltage of 7.2 volt. Although the holder 10 is shown to contain six battery cells, it should be understood that the holder can be adjusted to retain more or fewer battery cells.

Figure 3:
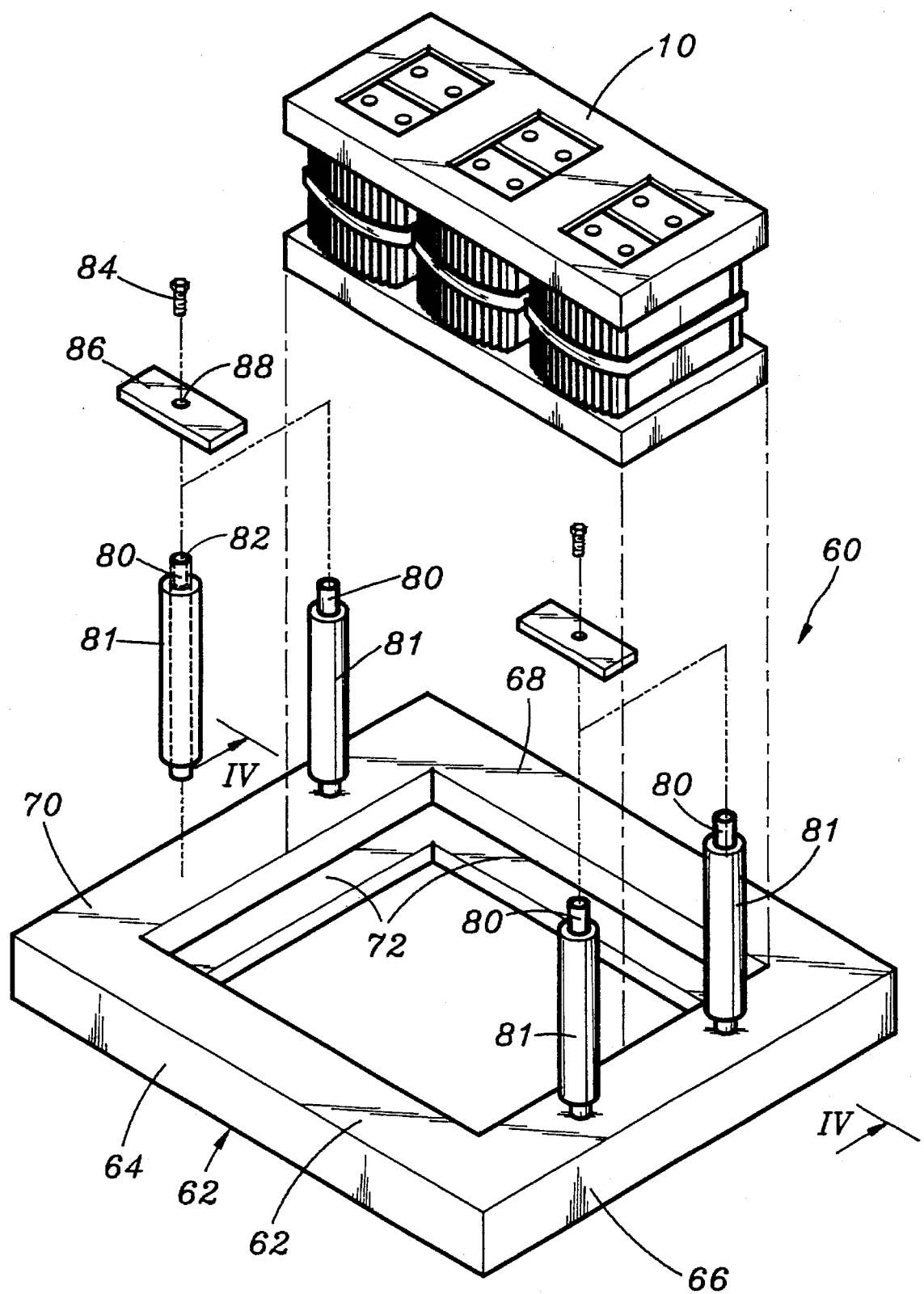
FIG. 3 is a perspective view of a retainer in accordance with the present invention.
Figure 4:
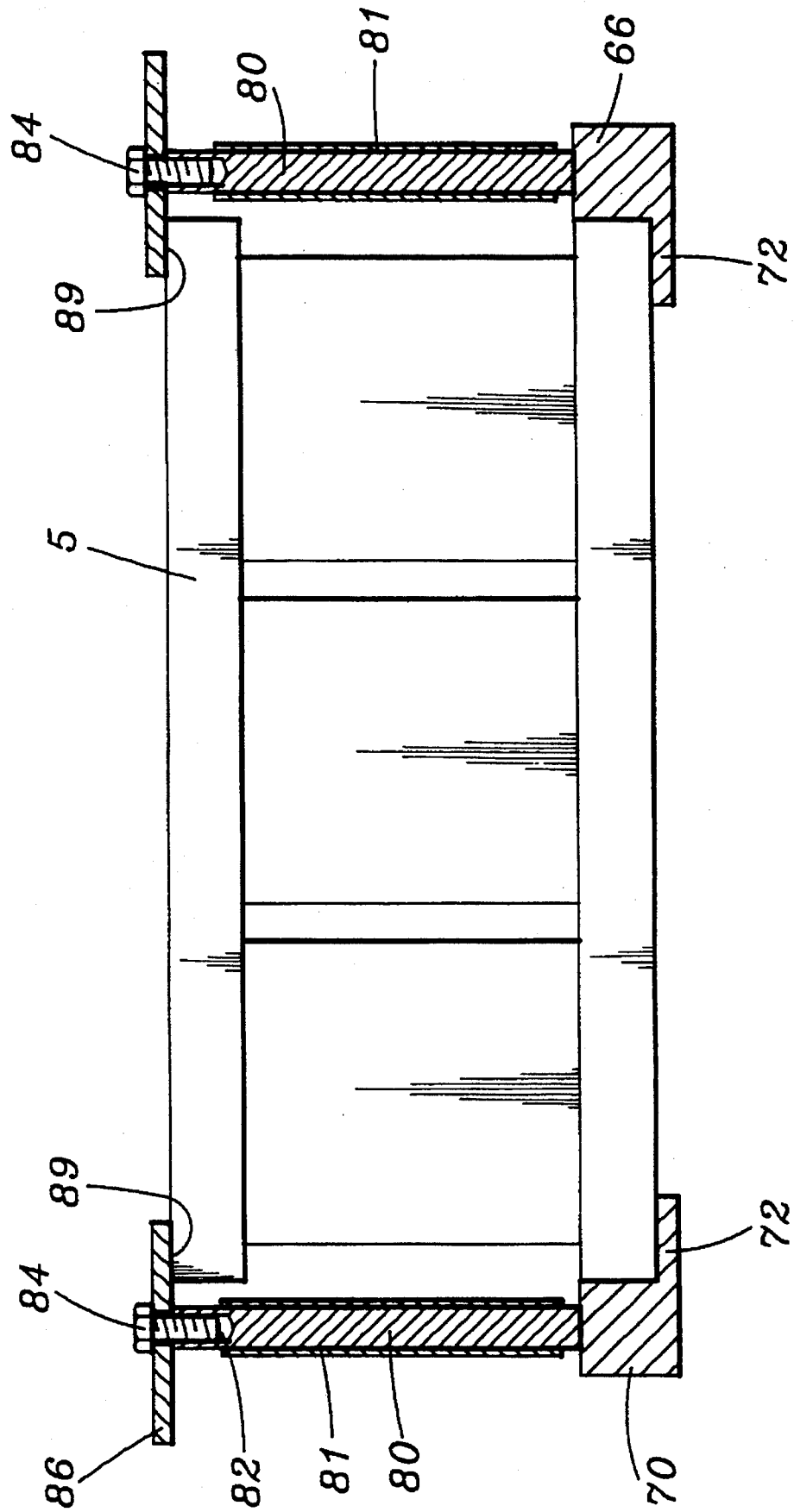
FIG. 4 is a sectional view taken along line IV—IV of FIG. 3.

Referring to FIGS. 3 and 4, there is shown a retainer 60 for securing the holder 10 containing the battery cells 12 therein. The retainer 60 has a frame 62 and a plurality of stay rods 80. The frame 62 is constructed of, e.g., four steel beams 64, 66, 68, 70 of rectangular shape. Horizontal shelves 72 extend from the bottom of the frame 62 beneath the holder 10 for the support thereof.

The stay rods 80 of steel stand on and are fixed to the beams 66, 70 by way of, e.g., welding. Each stay rod 80 is surrounded by a plastic tube 81 for insulation. A top portion of each stay rod 80 has a threaded hole 82. A pressing member 86 positioned above each stay rod 80 has an aperture 88 and a face 89 in contact with the holder 10. It is desirable that the pressing member 86 is made of an engineering plastic material. A securing bolt 84 passes through the aperture 88 of the pressing member 86 and is engaged with the threaded hole 82 of each stay rod 80. The retainer 60 is shown to be capable of securing two holders. However, it should be appreciated that the retainer 60 can be configurated to receive more holders.

As best illustrated in FIG. 4 the holder 10 carrying the battery cells 12 is mounted on the horizontal shelves 72. After the pressing member is positioned above each stay rod 80, tightening of each bolt 84 causes the pressing member 82 to press and secure the holder 10.

Figure 5:
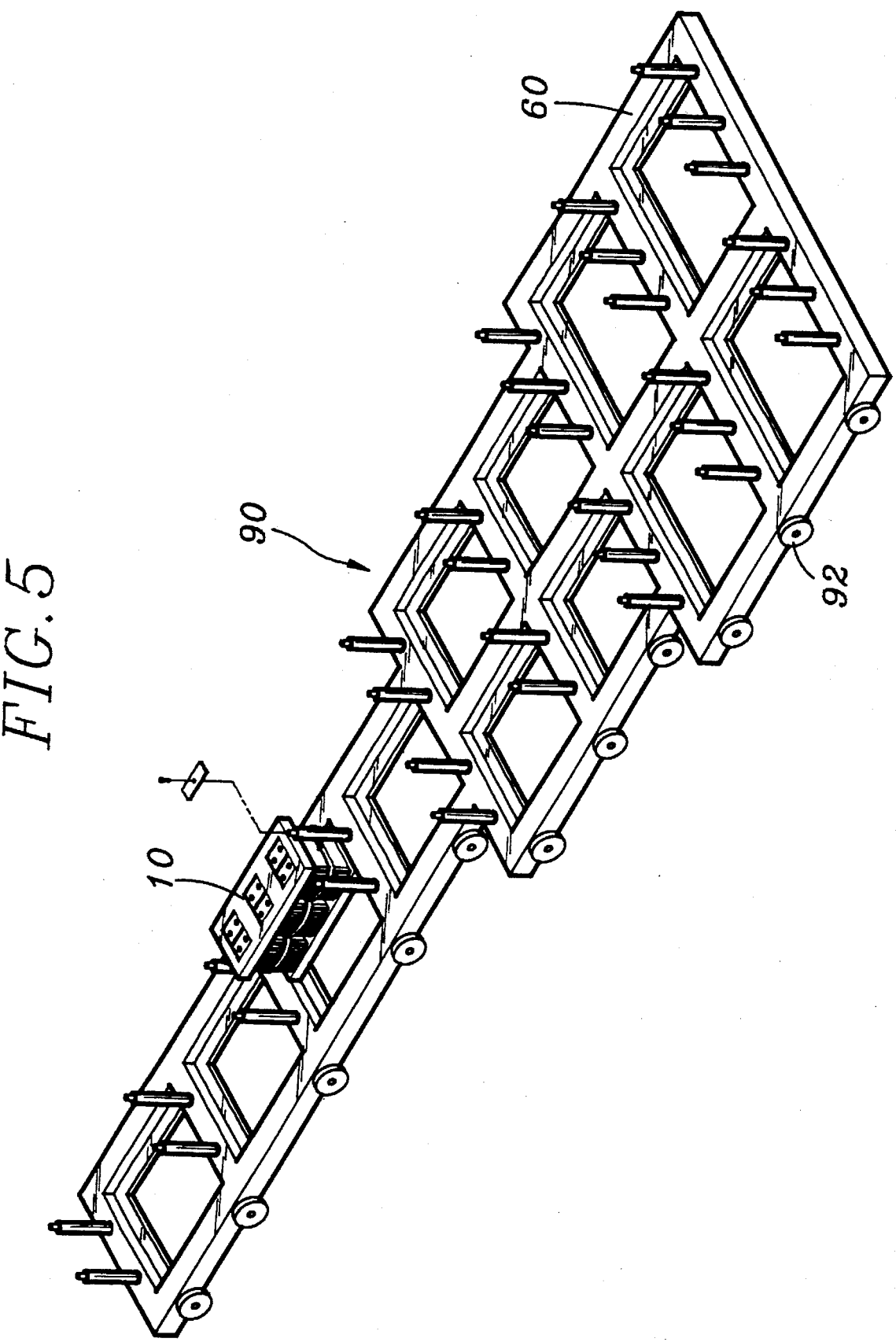
FIG. 5 is a perspective view of a retainer assembly constructed by way of arranging a plurality of retainers shown in FIG. 3.

Referring now to FIG. 5, there is shown a retainer assembly 90 constructed by way of arranging a plurality of retainers 60 for retaining a large number of holders. The beams, the stay rods and the pressing members may be entirely or partly shared by the adjacent retainers of the assembly 90. The assembly 90 may have a plurality of wheels 92 so as to facilitate the loading or unloading of the assembly 90 for repair or replacement of the battery cells.

Figure 6:
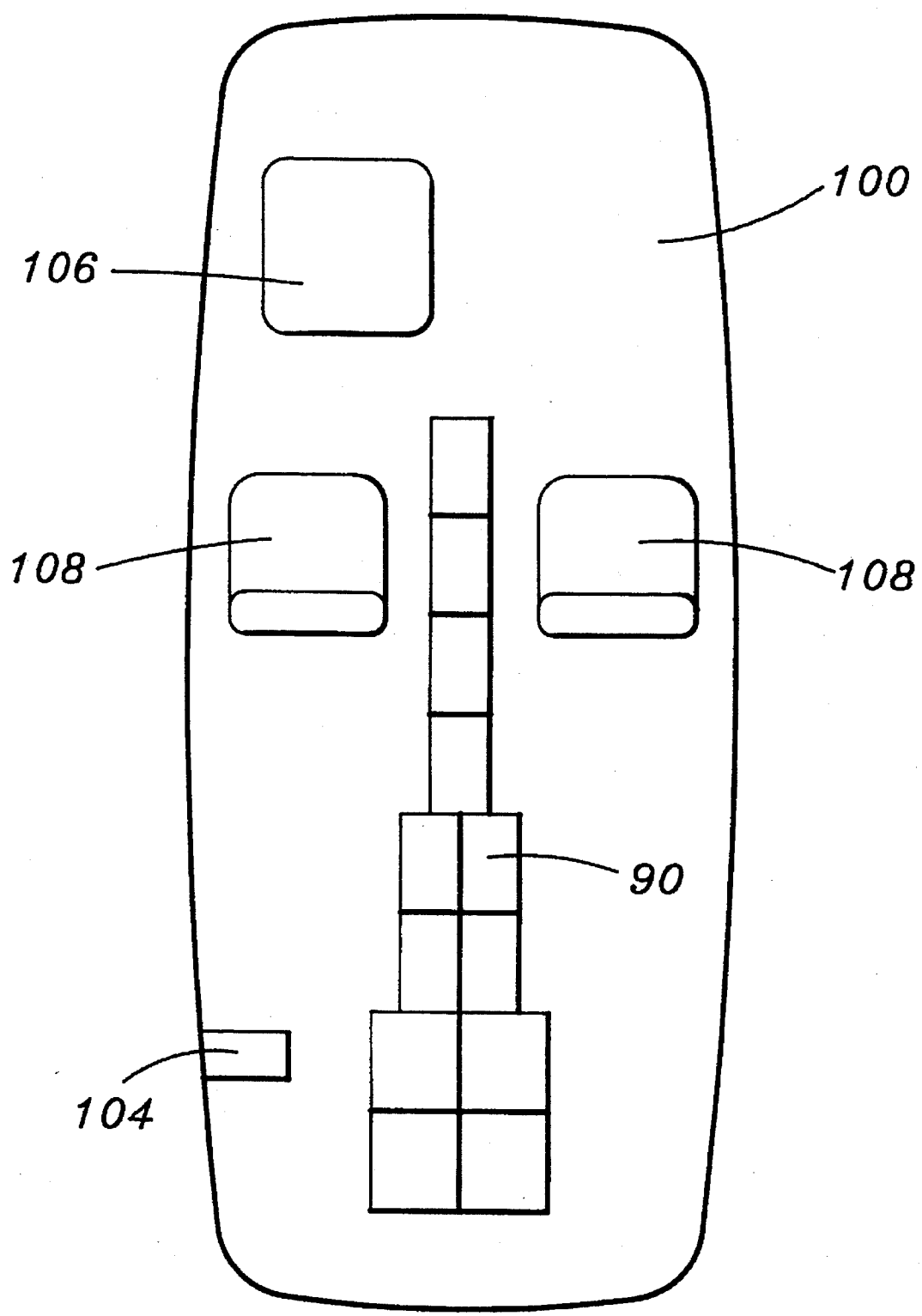
FIG. 6 is a plan view of an electric vehicle, showing schematically showing the retainer assembly incorporated therein.

FIG. 6 schematically represents the assembly 90 incorporated in an electric vehicle 100. A broader end portion of the assembly 90 is located at a rear trunk of the vehicle 100 and a narrower end portion thereof is positioned near the front seats 108. A socket 104 is placed at a side of the vehicle 100 and electrically connected to the battery cells contained in the holder. The drive motor 106 is arranged at a front of the vehicle 100 and uses the electric energy supplied from the battery cells for driving wheels.

Although the invention has been shown and described with respect to the exemplary embodiments, it should be understood that various changes, modifications and additions may be made without departing from the spirit and scope of the invention.

What is claimed is:

1. A holder for a plurality of battery cells, each battery cell having a plurality of electrodes and an electrolyte in a sealed housing and having positive and negative terminals, said holder being adapted to transfer heat produced by operation of the battery cells to external surroundings, said holder comprising:

a lower frame having a vertical rim and horizontal flanges extending inwardly from the bottom of the rim to define a receptacle;

a plurality of casings each for individually receiving an entirety of the housing of at least one of the plurality of battery cells, a bottom portion of each of the casings being received in the receptacle of the lower frame;

at least a pair of heat sink members attached to each of the casings, each of the heat sink members having a plurality of fins formed thereon; and an upper frame having a vertical rim and horizontal flanges extending inwardly from the top of the rim to contain and hold a top portion of each of the casings.

2. The holder according to claim 1, wherein said lower frame further has a vertical intermediate member extending between opposite sides of the rim, and horizontal flanges projecting from the bottom of the intermediate member.

3. The holder according to claim 1, wherein said fins positioned at a central portion of the each heat sink member protrude higher than the fins located at the sides thereof.

4. The holder according to claim 1, wherein each of said casings is made of a plastic material.

5. The holder according to claim 1, further comprising a band member for circumferentially securing said at least one pair of heat sink members to opposing sides of said casing.

6. The holder according to claim 1, wherein each of said plurality of casings accommodates at least two battery cell housings.

7. The holder according to claim 1, wherein each of said casings includes a bisected interior such that one battery housing is received within one half of each said battery casing.

8. The holder according to claim 1, wherein each of said casings receives two battery housings therein.

9. The holder according to claim 1, wherein each of said casings is bisected to receive two battery housings therein.

10. The holder according to claim 1, further comprising a retainer for securing said holder, said retainer including:

a frame having a plurality of side beams and horizontal shelves extending inwardly from the bottom of the frame for supporting said holder;

a plurality of stay rods vertically mounted on the beams, each of the stay rods having a first end portion fixed to the frame; and means for securing said holder, said means for securing being detachably attached to a second end portion of each of said plurality of stay rods.

11. The holder according to claim 10, wherein said securing means includes a bolt and a pressing member, said pressing member including an aperture through which the bolt passes and a face in contact with the holder, and said second end portion of each of the stay rods including a hole adapted to receive the bolt.

12. The holder according to claim 10, wherein said lower frame further has a vertical intermediate member extending between opposite sides of the rim, and horizontal flanges projecting from the bottom of the intermediate member.

13. The holder according to claim 10, wherein said fins positioned at a central portion of the each heat sink member protrude higher than the fins located at the sides thereof.

14. The holder according to claim 10, wherein each of said casings is made of a plastic material.

15. The holder according to claim 10, further comprising a band member for circumferentially securing said at least one pair of heat sink members to opposing sides of said casing.

16. The holder according to claim 10, wherein each of said plurality of casings accommodates at least two battery cell housings.

17. The holder according to claim 10, wherein each of said casings includes a bisected interior such that one battery housing is received within one half of each said battery casing.

18. The holder according to claim 10, wherein each of said casings receives two battery housings therein.

19. The holder according to claim 10, wherein each of said casings is bisected to receive two battery housings therein.

* * * * *